Aug. 25, 1970   TADASHI KOBAYASHI   3,525,477
DEVICE FOR FINE SCREENING OF PAPER STOCK
Filed Sept. 7, 1967   2 Sheets-Sheet 1

INVENTOR
TADASHI KOBAYASHI
By Linton and Linton
ATTORNEYS

Aug. 25, 1970  TADASHI KOBAYASHI  3,525,477
DEVICE FOR FINE SCREENING OF PAPER STOCK
Filed Sept. 7, 1967  2 Sheets-Sheet 2

INVENTOR
TADASHI KOBAYASHI
By Linton and Linton
ATTORNEYS

United States Patent Office 3,525,477
Patented Aug. 25, 1970

3,525,477
DEVICE FOR FINE SCREENING OF PAPER STOCK
Tadashi Kobayashi, 277 Mitoshima, Shizuoko-ken,
Fuji-shi, Japan
Filed Sept. 7, 1967, Ser. No. 666,031
Int. Cl. B02c *17/02*
U.S. Cl. 241—74                                4 Claims

ABSTRACT OF THE DISCLOSURE

The present device includes a box wherein paper stock or used paper is beaten, pulped, cleansed and screened at the same time and from which box foreign matter and the screened stock are delivered through separate outlets of the box.

---

This invention relates to a device capable of simultaneously beating, pulping, cleaning, and screening paper stock by circulating material pulp or used paper in a single box for beating and pulping while separating and eliminating foreign matter from the stock in a section below the box toward the front, and finally screening the stock in the rear of the box, with inner and outer stock guide passages provided in the box to facilitate the stock flow.

Heretofore, the process of preparing paper stock from material pulp or used paper has consisted of at least three separate stages—beating and pulping material pulse or used paper, removing foreign matter contained therein, and finally screening the refined stock—connected in a series to form a flow system for stock preparation. This process has had a number of serious cost disadvantages, such as the facts that the equipment is considerable in size, takes up much space for installation, and requires a great deal of power for operation, and that much labor is needed to run and maintain the three separate stages. Moreover, it has been considered difficult to develop a device capable of freeing used-paper stock from synthetic resin coming from plastic-coated paper or plastic-containing ink widely used in recent years.

It is an object of the present invention to provide a device capable of beating, pulping, cleaning, and screening paper stock in a single box and more economically than the conventional type of equipment as to installation space, power consumption, and labor cost.

Another object of this present invention is to provide a device capable of efficiently preparing refined stock from all types of used paper by means of a box in which inner and outer guide passages are provided for raw stock, which is supplied in a concentrated flow along the inner guide passage and dashes against a rotary disk, from which the stock is led through the outer guide passages and recycled in the box, thus circulating for repeated processing.

To illustrate the present invention, a preferred embodiment thereof is described below in conjunction with the accompanying drawings in which.

Figure 1:
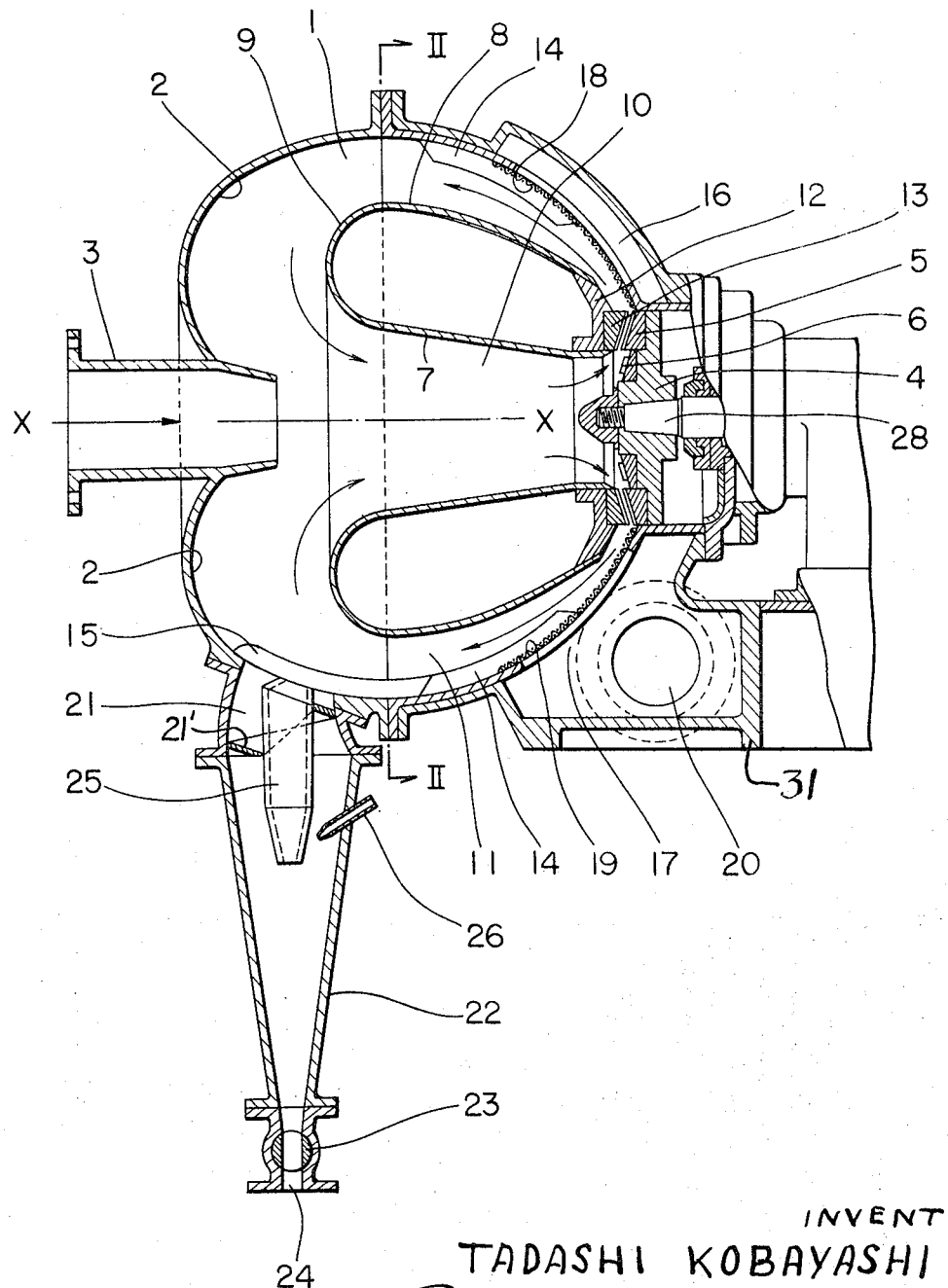
FIG. 1 is a longitudinal sectional view of a device according to the present invention showing the internal structure of its main portion.
Figure 2:
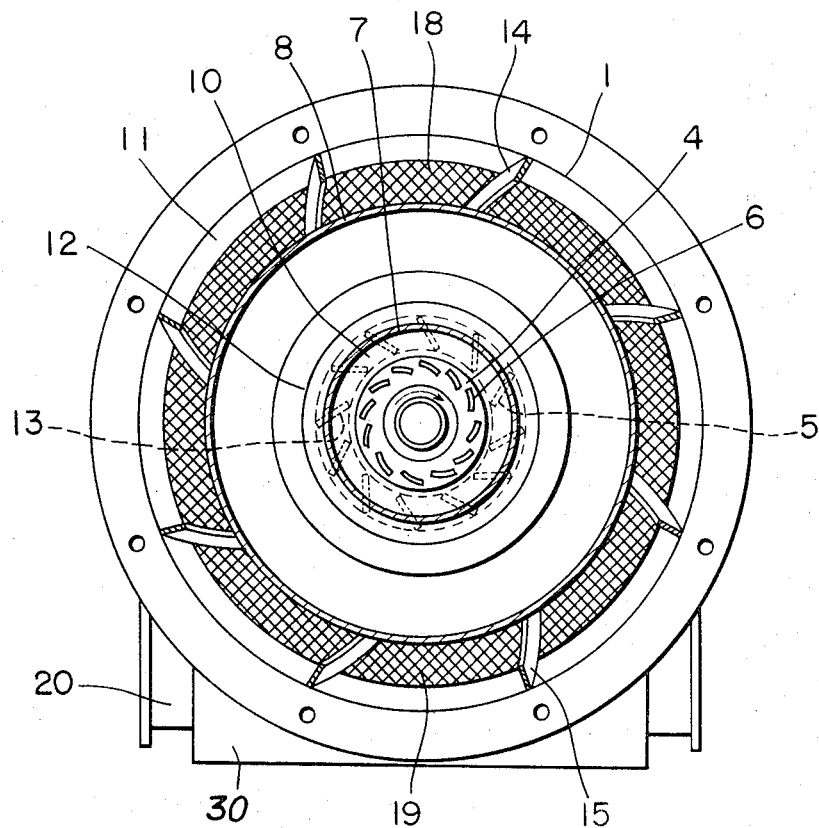
FIG. 2 is a transverse cross-section of the same device taken along the line II—II in FIG. 1.
Figure 3:
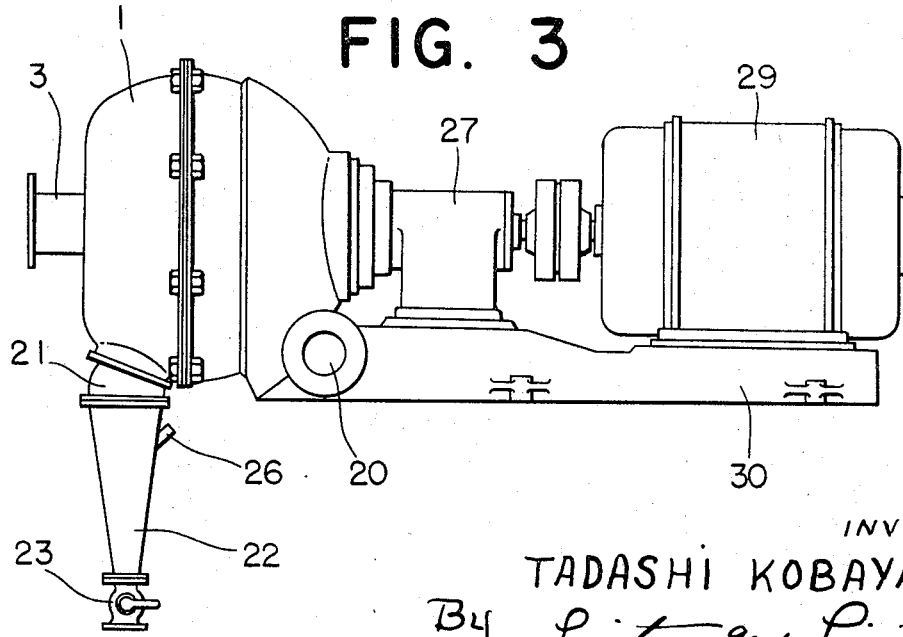
FIG. 3 is a side view in elevation of the assembly as directly coupled with an electric motor.

Referring to the drawings, a box 1 is approximately spherical except for its front 2, which is curved inward toward the horizontal axis X—X in FIG. 1, giving the box a heart-shaped section. In the middle of the curved front 2, along the horizontal axis X—X, is a stock feed pipe 3, the end of which opens into the box 1.

A rotary disk 4 is mounted in the rear of the box 1 rotatably around the horizontal axis X—X opposite said opening of the stock feed pipe 3. Mounted on the disk 4 are a number of cutting blades 5 and 6, slanted outward.

An inner guide wall 7 and an outer guide wall 8 are provided in the box 1, joining toward the front to form a curved surface 9. Thus, an inner guide passage 10 is formed along the horizontal axis X—X and an outer passage 11, is formed along the inner surface of the box 1.

Also mounted inside the box is a stationary disk 12 with a number of cutting blades 13 set opposite the cutting blades 5 of the rotary disk 4 with a proper clearance between them. The ends of the inner and outer guide walls 7 and 8 are connected to this stationary disk 12.

A number of outer vane-shaped guide plates 14 are mounted on the inner surface of the box 1 at proper intervals around its circumference. These guide plates 14 are slanted toward the front.

Flow chambers 16 and 17 are provided behind the box 1, separated from the inside of the box 1 by screens 18 and 19. The flow chambers 16 and 17 are connected to each other, and lead to an outlet 20 mounted in base 30.

A cleaner 21 for removing foreign matter opens below the box 1 toward the front, and forms a unit with a tubular member 22 shaped like an inverted cone below, a control cock 23 further down, and a discharge port 24 at the bottom.

Approximately in the middle of the cleaner 21 is a guide 25 pointed downward and having a tip shaped like an inverted cone. Also, in the upper part of the tubular member 22 is a fresh water injection pipe 26, opening tangentially to the inner circumference of the cylinder.

The machine sits on a base 30, on which there is mounted a bearing assembly 27. The tip of this bearing assembly 27 and the tip of the base 30 support the box 1. The bearing assembly 27 supports the spindle 28 of the rotary disk 4, thus directly coupling together the spindle 28 and an electric motor 29.

The machine operates in the following manner:

The rotary disk 4 is driven by the electric motor 29, and raw stock consisting of material pulp or used paper (with a water content of about 3.0 to 3.5 percent) is supplied through the feed pipe 3 into the box 1. The stock hits the rotary disk 4, and is beaten and pulped as it passes through the clearance between the cutting blades 5 and 13. Centrifugal force causes the stock to run along the outer guide plates 14 toward the front of the box 1, where it is carried along the curved surfaces 2 and 9 and back to the center to be thrust again in a concentrated flow through the inner guide passage 10 against the rotary disk 4, thus repeating the operating cycle until the stock is sufficiently beaten and pulped. Meanwhile, any synthetic resin from plastic-coated paper or plastic-containing ink in the stock is separated.

Stock thus beaten and pulp is led by an extension 15 of an outer guide plate 14 and enters the cleaner 21 in which it is guided by the guide 21' to form a spiral whirlpool. Fresh water shot from the injection pipe 26 rushes along the inner circumference of the cylinder 22, and centrifugal force causes foreign matter contained in the stock, such as metal fasteners for book binding and sand, to be separated and move down the tubular member 22, past the cock 23, and out through the discharge port 24.

Thus cleaned of foreign matter, the stock ascends along the central axis of the cleaner 22 because of a pressure difference between its inlet and outlet, and flows back into the box 1 through the guide 25, and driven by centrifugal force in the box 1, passes through the screens 18 and 19 in the rear of the box 1. Finally, the screened stock in the flow chambers 16 and 17 joins and goes out through the outlet 20 to be sent to the next manufacturing stage.

As may be seen from the above description, a device according to the present invention achieves the beating, pulping, cleaning and screening of paper stock in a single box, and therefore is greatly superior to the conventional type of pulp refining equipment from the cost point of view.

Although the present invention has been described in conjunction with a preferred embodiment, it is to be understood that the invention is not limited to this embodiment and that modifications and variations may be resorted to without departing from the spirit and scope of the invention as described above.

I claim:

1. A device for refining paper stock consisting of a spherical box with a curved front giving a heart-shaped longitudinal section to the box, a stock feed pipe running through the front of the box along the horizontal axis thereof and opening into said box, a rotatably driven cutter disk positioned in the rear of said box opposite the opening of said feed pipe, an inner guide wall and an outer guide wall being provided between the opening of said stock feed pipe and said rotary cutter disk and joined towards the front of said box by a curved surface forming an inner guide passage along the horizontal axis of said box and an outer guide passage along the inner surface of said box, said box having a cleaner opening below said box towards the front thereof whereby the beaten and pulped stock will flow into the cleaner, be cleansed of foreign matter contained therein and flow back into said box, and screens mounted in and separating the rearmost portion of said box forming flow chambers into which refined stock, driven by centrifugal force, will flow through the screens.

2. A device as claimed in claim 1, wherein a stationary cutter disk is provided face to face with said rotary cutter disk and with a clearance therebetween.

3. A device as claimed in claim 1 wherein a plurality of guide plates extending from the rear of said box towards its front are provided on the internal surface of said box at spaced intervals around its circumference and with an extension of one of said guide plates at the bottom of said box for leading stock into said cleaner.

4. A device as claimed in claim 1, including a machine base supporting said box, a bearing assembly installed on said base, and an electric motor mounted on said base and having a driving shaft supported by said bearing assembly with said rotary cutter disk being coupled to said shaft.

References Cited

UNITED STATES PATENTS

| | | | |
|---|---|---|---|
| 2,390,898 | 12/1945 | Rechtin et al. | |
| 2,434,449 | 1/1948 | Wells | 241—69 X |
| 2,930,534 | 3/1960 | Baxter | 241—82 X |
| 2,951,649 | 9/1960 | Rietz. | |
| 2,973,153 | 2/1961 | Rich | 241—74 X |
| 3,307,791 | 3/1967 | Nagai | 241—74 |
| 3,380,669 | 4/1968 | Hatton | 241—46 X |

FRANK T. YOST, Primary Examiner

U.S. Cl. X.R.

241—82, 245, 255